United States Patent
Tripathi et al.

(10) Patent No.: US 10,949,474 B2
(45) Date of Patent: Mar. 16, 2021

(54) METHOD AND SYSTEM FOR PERFORMING TOPIC-BASED AGGREGATION OF WEB CONTENT

(71) Applicant: Innoplexus AG, Eschborn (DE)

(72) Inventors: Gaurav Tripathi, Pune (IN); Vatsal Agarwal, Rampur (IN); Sandeep Singh, Mysore (IN); Dhruv Shah, Ahmedabad (IN)

(73) Assignee: Innoplexus AG, Eschborn (DE)

( * ) Notice: Subject to any disclaimer, the term of this patent is extended or adjusted under 35 U.S.C. 154(b) by 139 days.

(21) Appl. No.: 15/855,395

(22) Filed: Dec. 27, 2017

(65) Prior Publication Data

US 2018/0239825 A1 Aug. 23, 2018

Related U.S. Application Data

(60) Provisional application No. 62/462,881, filed on Feb. 23, 2017.

(51) Int. Cl.
| | | |
|---|---|---|
| *G06F 16/00* | (2019.01) | |
| *G06F 16/951* | (2019.01) | |
| *G06N 5/02* | (2006.01) | |
| *G06F 16/955* | (2019.01) | |
| *G06N 20/00* | (2019.01) | |

(52) U.S. Cl.
CPC ........ *G06F 16/951* (2019.01); *G06F 16/9558* (2019.01); *G06F 16/9566* (2019.01); *G06N 5/02* (2013.01); *G06N 5/022* (2013.01); *G06N 20/00* (2019.01); *G06F 2216/03* (2013.01)

(58) Field of Classification Search
CPC ............... G06F 16/951; G06F 16/9558; G06F 16/9566; G06F 2216/03; G06N 5/02
See application file for complete search history.

(56) References Cited

U.S. PATENT DOCUMENTS

| | | | | |
|---|---|---|---|---|
| 2003/0225763 A1* | 12/2003 | Guilak | .................. | G06F 16/353 |
| 2009/0319481 A1* | 12/2009 | Chitrapura | ............ | G06F 16/951 |
| 2013/0254181 A1* | 9/2013 | Balassanian | .......... | G06F 16/951 |
| | | | | 707/709 |
| 2015/0026152 A1* | 1/2015 | Singh | .................... | G06F 16/951 |
| | | | | 707/710 |
| 2017/0061029 A1* | 3/2017 | Liu | ........................ | G06F 3/0482 |

(Continued)

*Primary Examiner* — Mark D Featherstone
*Assistant Examiner* — Kweku William Halm
(74) *Attorney, Agent, or Firm* — Ziegler IP Law Group, LLC

(57) ABSTRACT

A method and a system for performing topic-based aggregation of web content. The method includes receiving a plurality of Uniform Resource Identifiers, wherein each of the plurality of Uniform Resource Identifiers points to a web location related to a subject-matter; crawling the web location, to fetch web content related to the subject-matter, wherein the web content includes one or more elements; generating an electronic record file for storing the web content, and meta-information associated with the crawling of the web location; identifying a first type and at least a second type of the one or more elements; processing the first type of element to obtain a topic-based web content corresponding to a category associated with the subject-matter, and the at least one second type of element to obtain operational data; and aggregating the topic-based web content into a database.

17 Claims, 3 Drawing Sheets

(56) References Cited

U.S. PATENT DOCUMENTS

2017/0286544 A1* 10/2017 Hunt .................. H04L 63/1416
2019/0005113 A1*  1/2019 Kenedy .............. G06F 16/9535
2019/0065589 A1*  2/2019 Wen .................... G06F 16/951

* cited by examiner

METHOD AND SYSTEM FOR PERFORMING TOPIC-BASED AGGREGATION OF WEB CONTENT

CROSS REFERENCE TO RELATED APPLICATIONS

This application claims priority to U.S. Provisional Patent Application No. 62/462,881, filed Feb. 23, 2017, which is hereby incorporated by reference in its entirety.

TECHNICAL FIELD

The present disclosure relates generally to web crawling; and more specifically, to methods and systems for performing topic-based aggregation of web content. Moreover, the present disclosure also relates to computer readable medium containing program instructions for execution on a computer system, which when executed by a computer, cause the computer to perform method steps for performing topic-based aggregation of web content.

BACKGROUND

The World Wide Web (Web) has essentially provided an enormous distributed database that contains records of information covering countless topics. These records are contained in data files and such data files are located on computer systems connected to the web. Furthermore, such computer systems containing the data files are geographically distributed.

The computer systems and the data files contained within them are identified by locations provided by Uniform Resource Identifiers (URIs). Furthermore, many data files contain "hyperlinks" that refer to other data files located on possibly separate computer systems with different URIs. Web crawling is a process by which indices are constructed for Internet search engines. Such web crawling techniques operate recursively, such as, by indexing a current web page, then following the hyperlinks to other web pages contained in the current web page, indexing those linked web pages, and so forth.

However, conventional web crawling includes a number of problems. Typically, normal web crawling accesses data that is available in an uppermost layer of the web (or surface web). Furthermore, the surface web includes a limited amount of information as compared to deeper layers of the web (or deep web). Therefore, conventional web crawling that accesses the surface web is only capable of providing limited amount of information. Additionally, the information acquired from the conventional web crawling contains noise, i.e. the information includes a lot of unnecessary web content. Extracting relevant information from such information may be cumbersome and ineffective. Moreover, conventional web crawling is performed from a centralized machine and therefore, extracts lesser amount of information in a specific duration of time. Thus, conventional web crawling is time consuming. Additionally, the information extracted from conventional web crawling is generally stored without sorting the information, thereby generating a data set that may include redundant information.

Therefore, in light of the foregoing discussion there exists a need to overcome the aforementioned drawbacks associated with the conventional web crawling techniques and aggregation of information generated from such web crawling.

SUMMARY

The present disclosure seeks to provide a method of performing topic-based aggregation of web content. The present disclosure also seeks to provide a system for performing topic-based aggregation of web content. The present disclosure seeks to provide a solution to the existing problem of time consuming and inefficient web crawling associated with extraction of unstructured, redundant and a limited amount of information. An aim of the present disclosure is to provide a solution that overcomes at least partially the problems encountered in prior art, and provide a seamless, faster and efficient method of web crawling and extracting relevant information from the web.

In a first aspect, an embodiment of the present disclosure provides a method of performing topic-based aggregation of web content, the method comprising:
 a) receiving a plurality of Uniform Resource Identifiers, wherein each of the plurality of Uniform Resource Identifiers points to a web location related to a subject-matter;
 b) crawling the web location associated with each of the plurality of Uniform Resource Identifiers, to fetch web content available at the web location related to the subject-matter, wherein the web content includes one or more elements;
 c) generating an electronic record file for storing:
  the web content including the one or more elements; and
  meta-information associated with the crawling of the web location;
 d) identifying a first type and at least a second type of the one or more elements associated with the web content stored in the electronic record file;
 e) processing:
  the first type of element to obtain a topic-based web content, wherein the topic-based web content corresponds to a category associated with the subject-matter; and
  the at least one second type of element to obtain operational data; and
 f) aggregating the topic-based web content into a database.

In a second aspect, an embodiment of the present disclosure provides a system for performing topic-based aggregation of web content, the system comprising:
 a data repository operable to store a plurality of Uniform Resource Identifiers;
 a web crawling module including a communication interface for establishing a data connection with the data repository, wherein the web crawling module is operable to:
  receive the plurality of Uniform Resource Identifiers from the data repository, wherein each of the plurality of Uniform Resource Identifiers points to a web location related to a subject-matter;
  crawl the web location associated with each of the plurality of Uniform Resource Identifiers, to fetch web content available at the web location related to the subject-matter, wherein the web content includes one or more elements;
  generate an electronic record file for storing:
   the web content including the one or more elements; and
   meta-information associated with the crawling of the web location;

identify a first type and at least a second type of the one or more elements associated with the web content stored in the electronic record file;

process:

the first type of element to obtain a topic-based web content, wherein the topic-based web content corresponds to a category associated with the subject-matter; and the at least one second type of element to obtain operational data;

and a database arrangement communicably coupled to the web crawling module, wherein the database arrangement is configured to aggregate the topic-based web content.

In a third aspect, an embodiment of the present disclosure provides a computer readable medium containing program instructions for execution on a computer system, which when executed by a computer, cause the computer to perform method steps for method of performing topic-based aggregation of web content, the method comprising the steps of:

a) receiving a plurality of Uniform Resource Identifiers, wherein each of the plurality of Uniform Resource Identifiers points to a web location related to a subject-matter;

b) crawling the web location associated with each of the plurality of Uniform Resource Identifiers, to fetch web content available at the web location related to the subject-matter, wherein the web content includes one or more elements;

c) generating an electronic record file for storing:

the web content including the one or more elements; and meta-information associated with the crawling of the web location;

d) identifying a first type and at least a second type of the one or more elements associated with the web content stored in the electronic record file;

e) processing:

the first type of element to obtain a topic-based web content, wherein the topic-based web content corresponds to a category associated with the subject-matter; and the at least one second type of element to obtain operational data;

and f) aggregating the topic-based web content into a database.

Embodiments of the present disclosure substantially eliminate or at least partially address the aforementioned problems in the prior art, and enables an efficient and reliable topic-based aggregation of web content.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
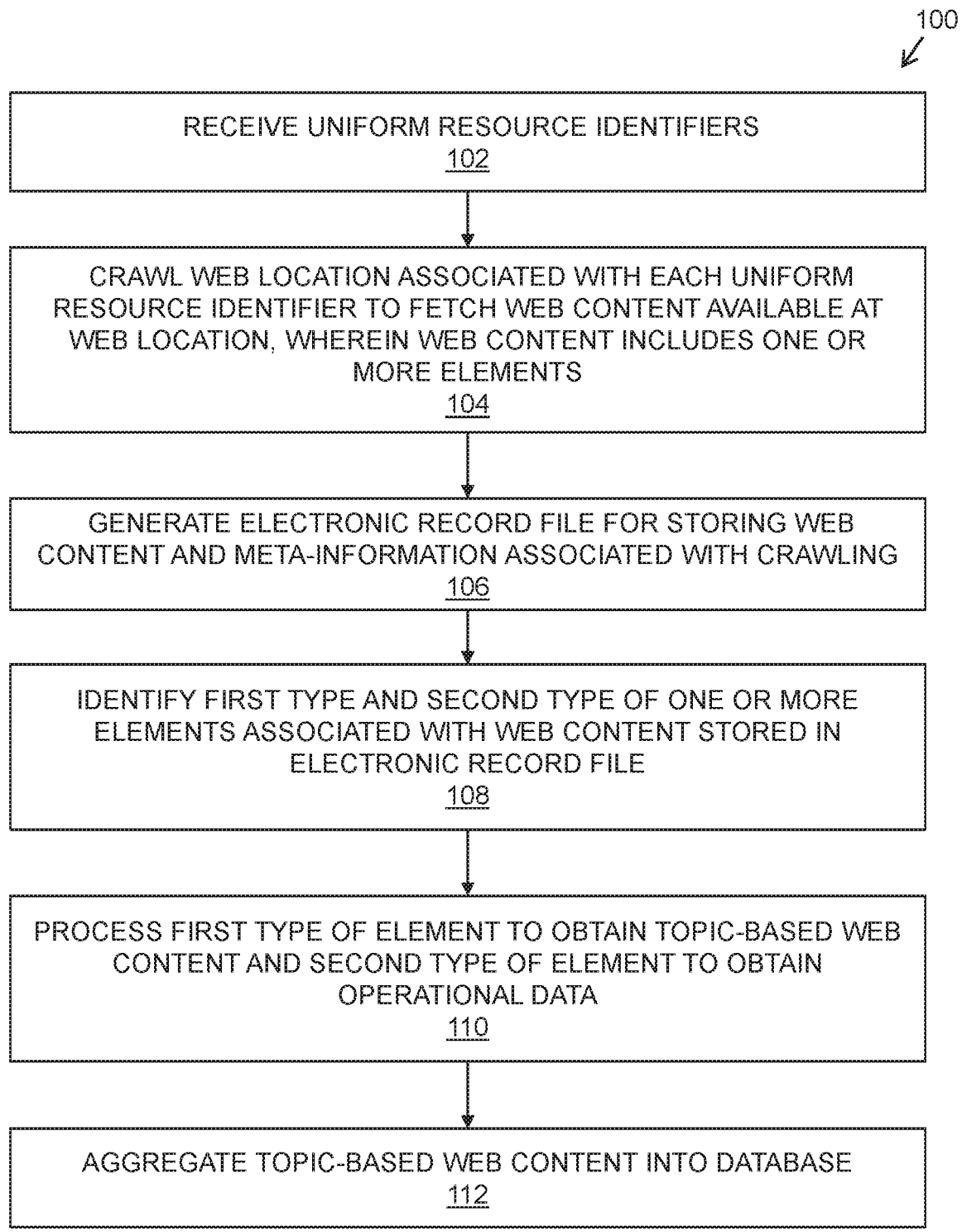
FIG. 1 is an illustration of steps of a method of performing topic-based aggregation of web content, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a method of performing topic-based aggregation of web content, the method comprising:

a) receiving a plurality of Uniform Resource Identifiers, wherein each of the plurality of Uniform Resource Identifiers points to a web location related to a subject-matter;

b) crawling the web location associated with each of the plurality of Uniform Resource Identifiers, to fetch web content available at the web location related to the subject-matter, wherein the web content includes one or more elements;

c) generating an electronic record file for storing:

the web content including the one or more elements; and meta-information associated with the crawling of the web location;

d) identifying a first type and at least a second type of the one or more elements associated with the web content stored in the electronic record file;

e) processing:

the first type of element to obtain a topic-based web content, wherein the topic-based web content corresponds to a category associated with the subject-matter; and the at least one second type of element to obtain operational data; and f) aggregating the topic-based web content into a database.

In a second aspect, an embodiment of the present disclosure provides a system for performing topic-based aggregation of web content, the system comprising:

a data repository operable to store a plurality of Uniform Resource Identifiers;

a web crawling module including a communication interface for establishing a data connection with the data repository, wherein the web crawling module is operable to:

receive the plurality of Uniform Resource Identifiers from the data repository, wherein each of the plurality of Uniform Resource Identifiers points to a web location related to a subject-matter;

crawl the web location associated with each of the plurality of Uniform Resource Identifiers, to fetch web content available at the web location related to the subject-matter, wherein the web content includes one or more elements;

generate an electronic record file for storing:
the web content including the one or more elements; and
meta-information associated with the crawling of the web location;

identify a first type and at least a second type of the one or more elements associated with the web content stored in the electronic record file;

process:
the first type of element to obtain a topic-based web content, wherein the topic-based web content corresponds to a category associated with the subject-matter; and
the at least one second type of element to obtain operational data;

and a database arrangement communicably coupled to the web crawling module, wherein the database arrangement is configured to aggregate the topic-based web content.

The present disclosure provides the method and the system for performing topic-based aggregation of web content. The method enables effective and reliable aggregation of topic-based web content. The method enables efficient crawling to fetch relevant web content from web locations. Beneficially, such fetching of the relevant web content includes information that is highly informative and significant. Furthermore, the crawling is performed by a web crawling module implemented in a distributed architecture that enables faster crawling as compared to conventional web crawlers implemented in a centralized architecture. Furthermore, the method involves performing deep crawling of the web location to extract the relevant information. Consequently, the method performs extraction of additional information as compared to conventional web crawling. Additionally, the fetched topic-based web content is classified into categories and contextually arranged in the database arrangement. The method can be used to generate a database that systematically arranges the topic-based web content for subsequent access.

The system for performing topic-based aggregation of web content relates to an arrangement including programmable and/or non-programmable components. The programmable and/or non-programmable components are configured to browse the World Wide Web (referred to, herein later as "web") for accessing web content related to a subject-matter (such as life science), and thereafter categorise, analyze and store the web content. Furthermore, the system is operable to classify the web content into one or more categories for storing the web content. Optionally, the system is a data curating system. Furthermore, the system implemented as the data curating system, is operable to search and archive the most relevant objects (such as terms, images and the likes) from the web content (i.e. the objects that are likely to be useful in future). Moreover, the system implemented as the data curating system, is operable to retain the aforesaid objects using appropriate hardware, and addressing various aspects of archiving data, such as creating backups of the data, removing redundancy from the data, indexing the data and the likes.

Throughout the present disclosure, the term "aggregation" relates to a process of extracting relevant web content, analyzing the web content to draw conclusions and/or combining the web content into a new representation. Furthermore, the aggregation includes a number of functions that are performed on the extracted web content. Optionally, the functions performed on the extracted web content include parsing, cleansing, normalizing, transforming, validating, formatting, and classifying data in the web content. The term "topic-based aggregation" relates to a process of collecting web content that is related to a specific subject-matter (such as pharmaceuticals).

Optionally, the topic-based aggregation includes determining a symbolic structure of a data file or string of symbols in a computer language and placing the symbolic structure or the string of symbols into predetermined data fields as recorded data (referred to, herein later as "record") for later use. Furthermore, the topic-based aggregation includes flagging records that are missing data, removing duplicate records, and augmenting records by adding information to the records from the recorded data. Additionally, the topic-based aggregation includes functions that resolve the aforesaid inconsistencies into predetermined standard units or wording. Moreover, the topic-based aggregation includes transforming the data extracted from the web content that is related to the specific subject-matter, and subsequently saving the transformed data.

Throughout the present disclosure, the term "web content" relates to a type or arrangement of information accessible over the web, or over other portions of the Internet. Furthermore, the type or arrangement of information broadly refers to one or more documents, files, scripts, codes, executable programs, web pages or any other digital data that can be transmitted via a network (such as the Internet). Optionally, the web content relates to data associated with a webpage accessed by the programmable and/or non-programmable components of the system whilst browsing the web. Optionally, the web content is associated with a webpage that can include various web-based contents, such as, HTML content.

The system for performing topic-based aggregation of web content comprises the data repository that is operable to store the plurality of Uniform Resource Identifiers (URIs). Throughout the present disclosure, the term "data repository" relates to any device or combination of devices capable of storing, accessing and retrieving data, which may include any combination and number of data servers, databases, data storage devices and data storage media, in any standard, distributed or clustered environment. The data repository is configured to access and store the plurality of Uniform Resource Identifiers. Optionally, the data repository is configured to access and store a crawl frontier that includes a list of the plurality of Uniform Resource Identifiers (URIs). It will be appreciated that, the crawl frontier is a specific list of Uniform Resource Identifiers (URIs) that is accessed from the list of the plurality of Uniform Resource Identifiers (such as a seed list), and is arranged based on a priority of accessing the Uniform Resource Identifiers. Furthermore, the data repository can recursively access and store Uniform Resource Identifiers (URIs) from the crawl frontier according to a set of communication protocols. The data repository is operable to perform various operations, including but not limited to, executing one or more applications, handling data access and the like. Optionally, the system is configured to include appropriate hardware and software for incorporating the data repository.

Throughout the present disclosure, the term "Uniform Resource Identifiers" (referred to, herein later as "URIs") relates to any electronic object that identifies a resource on a network and that includes information for locating the resource. For example, the URIs act as references to web pages on the Internet. In an example, the URI is a Uniform Resource Locator (referred to, herein later as "URL"). Therefore, although the exemplary embodiments are described hereinafter with respect to URLs, a scope of claimed subject-matter is not so limited, and one or more of the described examples may be utilized in connection with the URI. In another example, the URI may include a uniform resource name (URN) and a URL. Optionally, the URI may be provided as a hyperlink. The term "hyperlink" relates to a reference that points to a resource available via a communication network and, when selected by a bot (such as computer program for web crawling), automatically navigates an application to the resource. In this regard, the hyperlink can include hypertext.

The system for performing topic-based aggregation of web content comprises the web crawling module. Throughout the present disclosure, the term "web crawling module" used herein relates to a computational unit that is operable to respond to and process instructions for carrying out web crawling. Optionally, the web crawling module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Optionally, the web crawling module includes logic embodied in hardware and/or firmware, and/or to a collection of software instructions, possibly having entry and exit points, written in a programming language, such as, for example, Java, C, and/or C++. These may be compiled and linked into an executable program, installed in a dynamic link library, or written in an interpreted programming language such as, for example, BASIC, Perl, or Python. Optionally, the executable program is configured to perform a specific task, and more preferably refers to a computer program that is configured to automate a computing task that would otherwise be performed manually. In an example, the executable program is a bot (or spider) that is configured to autonomously browse the web to extract web content. In such an example, the bot and/or spider may be hosted on a computing device (such as a computer, a laptop, a smartphone and the like). Furthermore, the web crawling module may be implemented using one or more individual processors, processing devices and various units associated with a processing device that may be shared by other processing devices. Additionally, the one or more individual processors, processing devices and units are arranged in various architectures for responding to and processing the instructions that drive the web crawling module to perform the web crawling. Optionally, the web crawling module is implemented in a distributed architecture. In the event wherein the web crawling module is implemented in the distributed architecture, the programs (such as the bots and/or spiders) for browsing the web are configured to be hosted on one or more computing hardware that are spatially separated from each other.

The web crawling module includes the communication interface for establishing the data connection with the data repository. Throughout the present disclosure, the term "communication interface" used herein relates to an arrangement of interconnected programmable and/or non-programmable components that are configured to facilitate data communication between one or more electronic devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed.

According to the present disclosure, the communication module is configured to operate as an interface for the web crawling module to establish the data connection with the data repository. The data connection establishes a means between a client, such as the bot and/or spider of the web crawling module, and the data repository, such as an extensible markup language (XML) data file. The bots and/or spiders of the web crawling module are operable to acquire the URIs from the data repository after the data connection is established between the web crawling module and the data repository using the communication interface.

The web crawling module is operable to receive the plurality of Uniform Resource Identifiers (URIs) from the data repository, wherein each of the plurality of Uniform Resource Identifiers points to a web location related to a subject-matter. The web crawling module acquires the URIs from the data repository to crawl the web location associated with each of the plurality of URIs. Throughout the present disclosure, the term "web location" used herein relates to web site, a web page, or another item of interest accessible on the web adapted to serve web content using any internetworking protocols, and is not intended to be limited to content uploaded or downloaded via the Internet or the Hyper Text Transfer Protocol (HTTP). Furthermore, the term "subject-matter" as used herein, relates to a specific field or topic. For example, the specific field or topic may be computers, bio-technology, life science, medical science, pharmaceuticals and the like. The plurality of URIs acquired from the data repository relate to specific subject-matter. Therefore, the web locations pointed to by the plurality of URIs includes web content related to the specific subject-matter. In an example, a web location pointed to by a URI may include web content related to a specific subject-matter such as pharmaceuticals. In such an example, the web content may include digital data including text, image, hyperlinks and the like, that are related to the specific subject-matter such as pharmaceuticals. Optionally, the web crawling module is operable to request the data repository to provide the URIs. Furthermore, each of the plurality of web crawling modules, such as one or more hardware hosting the programs for web crawling, are configured to individually request the URIs for the respective hardware. Optionally, the crawl frontier is operable to determine the list of URIs from the URIs accessed from the data repository, and provide the list of URIs to each of the plurality of web crawling modules.

The web crawling module is operable to crawl the web location associated with each of the plurality of Uniform Resource Identifiers to fetch web content available at the web location related to the subject-matter. The crawling (or spidering) of the web location is performed by a web crawler. The web crawlers can also be referred to as ants, bots, automatic indexers, web spiders, web robots, web scutters, and the like. The web crawler browses the web over a network, such as intranet or internet, in a methodical and orderly way. For example, while crawling, the crawler starts visiting the URIs specified in the list acquired from the data repository by the crawl frontier. As the crawler visits these URIs, the crawler can identify hyperlinks on the webpage associated with the URIs being visited. Thereafter, the webpages corresponding to the hyperlinks identified on the webpages are visited. Optionally, the crawler contains a number of rules for interpreting information found at a particular web site. These rules enable the crawler to choose one or more hyperlinks to be followed and other hyperlinks to be avoided; which webpages or parts of webpages to process and which ones to ignore; and so forth. The rules enable the web crawler to acquire relevant information as an amount of information available on the web continues to grow exponentially and only a portion of the information may be relevant. Optionally, the rules enable fetching the web content available at the web location related to the subject-matter (such as pharmaceuticals).

Optionally, the crawling further comprises determining a relevance of each of the plurality of Uniform Resource Identifiers, wherein the web content is fetched based on the determined relevance of each of the plurality of Uniform Resource Identifiers. Throughout the present disclosure, the term "relevance" used herein, relates to a measurement of how accurately a particular web document matches the subject-matter for which the web crawling is performed. In an example, relevance determined for a URI "A" is "X" and for another URI "B" is "Y". In such example, the determined relevance "X" refers to a condition that content related to subject matter based on which the crawling is performed, and "Y" refers to a condition that content related to subject matter based on which the crawling is not performed. Therefore, in web content may be fetched from the URI "A" having a relevance "X". Optionally, determining the relevance of the web content comprises identifying one or more features of the fetched web content. In an example, the one or more features of the fetched web content include determining a bag of words in the fetched web content, based on the bag-of-words model. In such an example, determining the bag of words includes identifying a number of terms or words mentioned in the web content that are related to the subject-matter based on which the web crawling was performed. In such example, if the subject-matter is related to pharmaceuticals, the terms or words considered can include a drug name, a drug composition, an organization name associated to a drug and the like. In an example, the one or more features of the fetched web content may include determining a tf-idf (term frequency-inverse document frequency) weighting value (namely, a notion of importance) for the fetched web content. In such an example, the tf-idf weighting value may act as a numerical statistic that reflects how important a word is in the fetched web content. Furthermore, if a word with high tf-idf weighting value is found to be repeated multiple times in the fetched web content, the fetched web content can be determined to be relevant. Subsequently, the corresponding URI associated with the fetched web content may be determined to be relevant. In an example, the one or more features of the fetched web content include a URL feature associated with the fetched web content. In such an example, the URL feature may be associated with determination of terms and/or words related to a specific subject-matter. Optionally, determining the relevance of the web content comprises analyzing the identified one or more features using an artificial intelligence algorithm to determine the relevance of each of the plurality of Uniform Resource Identifiers. Throughout the present disclosure, the term "artificial intelligence algorithm" used herein relates to software-based algorithms that are executable upon a computing hardware, and are operable to adapt and adjust their operating parameters in an adaptive manner, depending upon information that is presented thereto when executed upon the computing hardware. Optionally, the algorithms involve a decision tree or a decision network, defining decision states concerning whether or not a URI is relevant. Furthermore, weighting values associated with the decision states are based on previous experiences of recognizing the one or more features of the web content fetched from the URI. Optionally, the algorithm is operable to migrate between the decision states depending upon the web content presented to the algorithms in operation. Moreover, the algorithms are operable to generate new decision states for new types of content that have not previously been provided to the algorithms, as determined using a matching function of the algorithms that compares a given type of web content with another type of web content. The matching function is optionally based upon a neural network that is trained against different types of web content to differentiate therebetween. For performing such a comparison of the web content, the web content is processed to generate metadata, or pseudo-metadata, wherein the matching function is operable to determine a "distance" between the web contents being compared, based at least in part upon the metadata or the pseudo-metadata. For example, the pseudo-metadata may be a combination of parameters of the metadata and a portion of the web content being compared; the metadata may define the web content that relates to a subject-matter. Optionally, the weighting value of the one or more features of the fetched web content is provided to the algorithm for determining the relevance of the fetched web content and subsequently the relevance of the URI. In an example, the algorithm is a random forests algorithm.

The web content fetched by the web crawling module includes one or more elements. Throughout the present disclosure, the term "elements" used herein relates to objects included in a web location (or webpage). The elements are the objects that are used to include interactive data. In an example, the one or more elements may dynamically generate additional page content when interacted with. Optionally, the one or more elements comprise any one of web forms, hyperlinks, text, and/or metadata associated with the one or more elements. The term "web form" as used herein, relates to any webpage that allows inputting of data which is subsequently sent to a computing device (such as server) hosting the webpage. The web form can be a document in the web page that includes one or more input fields for acquiring the data. Furthermore, the webpage including the web form may be operable to generate additional page content based on the data acquired through the web form. For example, the web form may include an input field that allows selection of an item from a collection of two or more items. The web form may be of various types. In an example, the web form may be a survey form that acquires data from users related to a specific subject-matter. In such an example, the web form may receive an input of a drug name. Furthermore, the web form may be subsequently operable to display information related to the drug. Such displayed information may include a chemical composition of the drug, a name of an organization that manufactures the drug, one or more health problems for which the drug can be used for, and so forth. In another example, the web form may be a login form that allows access to a set of restricted information. In such an example, subsequent to inputting information into the login form, access may be provided to a web page that includes the restricted information, such as information related to one or more drugs that are used for one or more health problems. Optionally, the one or more elements comprise a hyperlink, wherein the hyperlink is a feature of a displayed image or text that provides additional information when activated, for example by clicking on the hyperlink. For example, the hyperlink is an image or text that is operable to generate new web content when interacted with. In such an example, the hyperlink may be a URL that points to a different web page contenting additional web content. In an example, the hyperlink is indicated by a HTML HREF attribute. Optionally, the one or more elements comprise text that describes one or more subject-matters. For example, the text may describe various attributes of a drug. In such an example, the text may describe a chemical composition of the drug, an organization that manufactures the drug, health problems for which the drug is used for, a method of using the drug, side effects associated with the drug and so forth. The term "metadata" as used herein refers to data which provides information about one or more aspects of a data file (such as the fetched web content). The metadata can include a hash of the contents of the data file, as well as additional data relating, for example, to a policy for handling the data file.

The web crawling module is further operable to determine the one or more elements to be a web form. The web crawling module determines an element of the one or more elements to be the web form by detecting the features of the one or more elements. For example, when the features of the element of the one or more elements include at least one interactive item, the element is deemed to be the web form. Furthermore, the at least one interactive item may include a text box, a selection box, a radio button, a submit button, a drop down list and the like. The web crawling module is operable to extract one or more web form attributes from the web form. The term "web form attribute" relates to characteristics associated with the web form. For example, the one or more web form attributes may include a type of the web form, a type of an input field included in the web form, a field placeholder of the web form and the like. The one or more web form attributes enable an appropriate interaction of the web crawling module with the web form. Optionally, the web crawling module is configured to implement a regression model to accurately determine the one or more web form attributes, such as the type of the web form. Optionally, the regression model is a logistic regression model. The logistic regression model is a statistical model capable of calculating a probability of the type of the web form. Optionally, the logistic regression model uses data previously provided for each type of the web form, as an input data for calculating a probability of the type of the web form. The web crawling module is operable to identify one or more input fields in the web form based on the extracted one or more web form attributes. The web crawling module uses a machine learning model for identifying the one or more input fields in the web form. The machine learning model uses the one or more extracted web form attributes of the web form to determine a state of the input fields in the web form. Subsequently, the state of the input fields in the web form is used to suggest a type of information required to be input into the input fields. For example, the machine learning model is used to identify if the input field is a text field that accepts text as an input. In another example, the machine learning model is used to identify if the input field is a radio button that may be used to select an option. Optionally, the machine learning model is conditional random field-based (CRF-based) machine learning model. The web crawling module is operable to populate the one or more input fields with information fetched from an ontology database. Throughout, the present disclosure, the term "ontology database" as used herein, relates to an organized body of digital information that relates to a set of concepts (namely, information, ideas, data, semantic associations and so forth) in a field of interest (namely, subject area, domain and so forth) that details types and properties of the set of concepts (such as semantic associations) thereof. Furthermore, the ontology database provides context-based search to extract contextually (namely, conceptually) relevant information pertaining to the field of interest. Moreover, the ontology database provides a structured, optimal and relevant set of concepts pertaining to the field of interest. Furthermore, the ontology database is used in scientific research, academic studies, market analysis and so forth. Optionally, the ontology database includes the set of concepts in a form of text, image, audio, video, or any combination thereof. Additionally, the ontology database provides information on how a certain concept from the set of concepts associated with a certain field of interest can be related to one or more concepts in other fields of interest. Optionally, the ontology database may be implemented using hardware, software, firmware and/or any combination thereof. For example, the ontology database includes any data storage software and/or hardware, such as, a relational database like IBM DB2 and Oracle 9. The web crawling module is operable to acquire the information from the ontology database for populating the one or more input fields based on the state of the input fields in the web form. In an example, when the input field is a text field, the web crawling module is operable to acquire textual data from the ontology database. In another example, when the input field includes radio buttons for selection of an item from a collection of two or more items, the web crawling module is operable to acquire relational data related to two or more items in the collection. In such an example, the web crawling module may employ a machine learning model to use the relational data for selecting an item from the collection of two or more items, by highlighting a corresponding radio bottom.

The web crawling module is operable to generate an electronic record file. Throughout the present disclosure, the term "electronic record file" relates to any recording of data representing a list of activities (or events) that are logged by a computational element (such as the web crawling module). The electronic record file includes any type of electronic record of information, such as, events that take place during an operation of the system. The electronic record file represents an audit trail of events that can be used to understand the operation of the system. The electronic record file is configured to store the web content including the one or more elements. The web content extracted by crawling the web location is stored in the electronic record file. The web content stored in the electronic record file includes web forms, hyperlinks, text and the like associated with the web content. Furthermore, additional web content generated from a web form included in a web location is stored in the electronic record file. The electronic record file is configured to store the meta-information associated with the crawling of the web location. Optionally, the meta-information associated with the crawling of the web location relates to a set of data that describes attributes of the crawling process. In an example, the set of data describing the attributes of the crawling process includes a time of crawling, a date of crawling, a browser application used for crawling and the like. Optionally, the electronic record file stores a list of hyperlinks acquired from crawling the web locations. Furthermore, the list of hyperlinks includes one or more hyperlinks that point to one or more web locations in the web. Optionally, the one or more hyperlinks include a Uniform Resource Identifier (URI) and/or a Uniform Resource Locator (URL).

The web crawling module is operable to identify a first type and at least a second type of the one or more elements associated with the web content stored in the electronic record file. The first type of the one or more elements refers to the web forms, text, and/or metadata associated with the one or more elements. The at least a second type of the one or more elements refers to the hyperlinks associated with the one or more elements. The type of the one or more elements is identified based on the features associated with the elements (as described hereinabove).

The web crawling module is operable to process the first type of element to obtain a topic-based web content, wherein the topic-based web content corresponds to a category associated with the subject-matter. Throughout the present disclosure, the term "topic-based web content" relates to web content that is related to a specific subject-matter. In an example, the topic-based web content is related to the specific subject-matter such as pharmaceuticals. The web crawling module is operable to extract the text available in the first type of element (such as the first type of the one or more elements). Optionally, the web crawling module is operable to use one or more algorithms and/or models to identify the text associated to the specific subject-matter. It will be appreciated that the web crawling module is operable to extract the web content for the web location after determining the web location to be relevant to the specific subject-matter, by using one or more algorithms and/or models. Therefore, the text included in the first type of element of the web content is associated with the specific subject-matter that is determined to be relevant by the web crawling module. For example, when the web crawling is associated with a subject-matter such as pharmaceuticals, the one or more algorithms and/or models used may be operable to determine a web location that is relevant to pharmaceuticals, thereby making the web content included in the web location to be relevant to pharmaceuticals. In such example, the topic-based web content, such as text, extracted from the web location may be a cancer drug name. In such example, the text, namely a cancer drug name, may correspond to a category of pharmaceuticals such as pharmaceutical product. Optionally, the topic-based web content further comprises metadata associated with the topic-based web content. The metadata associated with the topic-based web content includes a hash or digest of the topic-based web content as well as additional data relating, for example, policies for handling the metadata. The web crawling module is operable to store the textual content and the associated metadata locally (such as in a local memory).

The processing of the first type of element to obtain the topic-based web content further comprises classifying the topic-based web content into the category associated with the subject-matter. The classifying of the topic-based web content into the category includes identifying a specific subset of subject-matter of the topic-based web content within the subject-matter. In an example, the topic-based web content may include information describing a name of a drug. In such an example, the web content may be arranged within the subject-matter of pharmaceuticals. Furthermore, a name of the drug may be stored within a specific category of pharmaceuticals that describes the drugs for treatment of concussions.

Optionally, classifying the topic based web content into the category comprises identifying web content attributes associated with the topic-based web content. Optionally, identifying the web content attributes includes analyzing the topic-based web content to locate one or more objects in the topic-based web content. For example, the one or more objects include a HTML structure, a textual content, image tags, meta-tags and the like associated with the topic-based web content.

Optionally, the classifying of the-topic based web content into the category comprises extracting one or more characteristics associated with the topic-based web content. Optionally, the one or more characteristics include a term that is extracted from the topic-based web content. In another example, extracting the one or more characteristics of the topic-based web content includes determining a tf-idf (term frequency-inverse document frequency) weighting value (namely, a notion of importance) of the topic-based web content. In such an example, the tf-idf weighting value may act as a numerical statistic that is intended to reflect how important a term is in the topic-based web content. In another example, extracting the one or more characteristics of the topic-based web content may include determining similar words and/or terms in the topic-based web content by using a mapping function. In such an example, the word of the topic based web content is mapped on to a vector with a fixed size. For example, each of the words "dog", "cat", and "pen" may be converted into a word vector, and a Euclidean distance between each of a pair of the word vectors are determined and compared. Furthermore, because of similarities between the words "dog" and "cat" (such as, due to both the words being associated with animals), the word vectors associated therewith will be closer together (or nearer due to a smaller Euclidean distance between the associated word vectors) than, for example, the words "dog" and "pen" (as one is an animal and the other is a writing instrument).

Optionally, the topic-based web content is classified into the category based on the identified web content attributes and the extracted one or more characteristics by using an artificial intelligence algorithm. Optionally, the words having the same characteristics (such as tf-idf and mapping function) are provided to the artificial intelligence algorithm that is operable to employ one or more models, such as a random forest model, a logistic regression model and so forth. The artificial intelligence algorithm is operable to determine the category of the subject-matter to which the word in the topic-based web content relates to. Optionally, the artificial intelligence algorithm is operable to identify a subcategory within the category to which the word in the topic-based web content relates. For example, topic-based web content may include a word chemotherapy. In such example, the artificial intelligence algorithm may be configured to identify the word chemotherapy as a word related to a subcategory, namely cancer treatment, arranged within the category of diseases, namely cancer.

The web crawling module is operable to process the at least one second type of element to obtain operational data. Throughout the present disclosure, the term "operational data" relates to web content that is interactive and responds when activated. The web crawling module is operable to use one or more algorithms and/or models to obtain the operational data from the at least one second type of element. The one or more algorithms and/or models use the features of the at least one second type of element to obtain the operational data, wherein the features of the at least one second type of element are identified as described hereinabove. Optionally, the operational data comprises one or more hyperlinks retrieved from the web content stored in the electronic record file. Optionally, the one or more hyperlinks retrieved from the web content are stored in the electronic record file. Furthermore, such hyperlinks provide web locations that are relevant to the subject-matter associated with the web crawling.

Optionally, the processing of the at least one second type of element to obtain the operational data includes assigning a score to each of the one or more hyperlinks of the operational data. The scoring of each of the one or more hyperlinks includes calculating a probability of acquiring relevant web content from the web location associated therewith. Furthermore, calculating the probability includes providing features (such as URL features) associated with the hyperlinks to a machine learning model for identifying the probability of acquiring the relevant web content. Optionally, the score may be a numerical value that is assigned to each of the one or more hyperlinks. In an example, a hyperlink "A" has a score of 5 and another hyperlink "B" has a score of 3 for a specific subject-matter. In such an example, the hyperlink "A" may be determined to be more relevant as compared to the hyperlink "B" based on the assigned scores.

Optionally, processing the operational data includes determining a crawling strategy and a hyperlink priority for crawling a web location associated with each of the one or more hyperlinks, based on the score assigned to each of the one or more hyperlinks. For example, the score assigned to a hyperlink "A" is more than the score assigned to a hyperlink "B" for a specific subject-matter. In such an example, the crawling strategy for crawling includes accessing the web location associated with the hyperlink "A" before accessing the web location associated with the hyperlink "B" based on the assigned scores thereof. Optionally, the hyperlink priority for crawling a web location associated with each of the one or more hyperlinks refers to arrangement of the hyperlinks into a list based, at least on the scores assigned to each of the one or more hyperlinks. For example, in an event when the score associated to a hyperlink "A" is more than another hyperlink "B", determining the hyperlink priority includes arranging the hyperlink "A" before the hyperlink "B" in a list of hyperlinks. Optionally, the operational data including the one or more hyperlinks arranged in the list, based on the crawling strategy and the hyperlink priority for crawling web locations associated with each of the one or more hyperlinks, is provided to the data repository.

The system for performing topic-based aggregation of web content comprises a database arrangement communicably coupled to the web crawling module, wherein the database arrangement is configured to aggregate the topic-based web content. Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement includes a software program for creating and managing one or more databases. Optionally, the database arrangement may be operable to support relational operations, regardless of whether it enforces strict adherence to a relational model, as understood by those of ordinary skill in the art. Additionally, the database arrangement is populated by the topic-based web content. Optionally, and the database arrangement is populated by the operational data associated with the topic-based web content.

The database arrangement is configured to store the topic-based web content in categories and subcategories. Optionally, the database arrangement is operable to stores classified topic-based web content. Optionally, the classified topic-based web content are arranged in categories and subcategories related to the subject-matter. For example, a topic-based web content that relates to medical science may be stored in the database within a category (and/or a subcategory) related to medical science. In such an example, the topic-based web content comprises repetitive terms and terms similar to the repetitive terms, such as terms related to a specific disease (for example, diabetes). Furthermore, the topic-based web content is stored in the category related to diabetes within the database arrangement. Moreover, the topic-based web content may comprise repetitive terms and terms similar to the repetitive terms in a subcategory within the category, such as juvenile diabetes. In such an instance, the topic-based web content is stored in the subcategory related to juvenile diabetes within the database arrangement.

Optionally, the database arrangement is populated with the topic-based web content (and more optionally the operational data) in a non-redundant manner. Optionally, the database arrangement is configured to store the topic-based web content based on a value (such as hash value) associated with the topic-based web content. In an example, the database arrangement is configured to identify the hash value associated with the topic-based web content. In such an example, the database arrangement is configured to avoid storing another topic-based web content having a same hash value associated therewith. Optionally, the topic-based web content is indexed in the database arrangement with the associated URI from which the topic-based web content has been extracted.

Furthermore, there is disclosed a computer readable medium containing program instructions for execution on a computer system, which when executed by a computer, cause the computer to perform method steps for method of performing topic-based aggregation of web content, the method comprising the steps of receiving a plurality of Uniform Resource Identifiers, wherein each of the plurality of Uniform Resource Identifiers points to a web location related to a subject-matter; crawling the web location associated with each of the plurality of Uniform Resource Identifiers, to fetch web content available at the web location related to the subject-matter, wherein the web content includes one or more elements; generating an electronic record file for storing the web content including the one or more elements; and meta-information associated with the crawling of the web location; identifying a first type and at least a second type of the one or more elements associated with the web content stored in the electronic record file; processing the first type of element to obtain a topic-based web content, wherein the topic-based web content corresponds to a category associated with the subject-matter; and processing the at least one second type of element to obtain operational data; and aggregating the topic-based web content into a database.

Optionally, the machine-readable non-transient data storage media comprises one of a floppy disk, a hard disk, a high capacity read-only memory in a form of an optically-read compact disk or CD-ROM, a DVD, a tape, a read only memory (ROM), and a random access memory (RAM).

DETAILED DESCRIPTION OF THE DRAWINGS

Referring to FIG. 1, there are shown steps of a method 100 of performing topic-based aggregation of web content, in accordance with an embodiment of the present disclosure. At a step 102, a plurality of Uniform Resource Identifiers is received, wherein each of the plurality of Uniform Resource Identifiers points to a web location related to a subject-matter. At a step 104, the web location associated with each of the plurality of Uniform Resource Identifiers is crawled, to fetch web content available at the web location related to the subject-matter, wherein the web content includes one or more elements. At a step 106, an electronic record file is generated for storing the web content including the one or more elements, and meta-information associated with the crawling of the web location. At a step 108, a first type and at least a second type of the one or more elements associated with the web content stored in the electronic record file are identified. At step a 110, the first type of element is processed to obtain a topic-based web content, wherein the topic-based web content corresponds to a category associated with the subject-matter, and the at least one second type of element is processed to obtain operational data. At a step 112, the topic-based web content is aggregated into a database.

The steps 102 to 112 are only illustrative and other alternatives can also be provided where one or more steps are added, one or more steps are removed, or one or more steps are provided in a different sequence without departing from the scope of the claims herein. In an example, the step 104 further comprises determining a relevance of each of the plurality of Uniform Resource Identifiers, wherein the web content is fetched based on the determined relevance of each of the plurality of Uniform Resource Identifiers. In another example, determining the relevance comprises identifying one or more features of the fetched web content; and analyzing the identified one or more features using an artificial intelligence algorithm to determine the relevance of each of the plurality of Uniform Resource Identifiers. In one example, the one or more elements comprise any one of web forms, hyperlinks, text, and/or metadata associated with the one or more elements. In another example, the method 100 further comprises determining the one or more elements to be a web form; extracting one or more web form attributes from the web form; identifying one or more input fields in the web form based on the extracted one or more web form attributes; and populating the one or more input fields with information fetched from an ontology database.

In an example, the topic-based web content further comprises metadata associated with the topic-based web content.

In another example, the operational data comprises one or more hyperlinks retrieved from the web content stored in the electronic record file.

In one example, the step 110 comprises assigning a score to each of the one or more hyperlinks of the operational data; and determining a crawling strategy and a hyperlink priority for crawling a web location associated with each of the one or more hyperlinks, based on the score assigned to each of the one or more hyperlinks. In another example, the processing the first type of element to obtain the topic-based web content at step 110 further comprises classifying the topic-based web content into the category associated with the subject-matter. In yet another example, classifying the-topic based web content into the category comprises identifying web content attributes associated with the topic-based web content; extracting one or more characteristics associated with the topic-based web content; and classifying the topic-based web content into the category based on the identified web content attributes and the extracted one or more characteristics by using an artificial intelligence algorithm.

Figure 2:
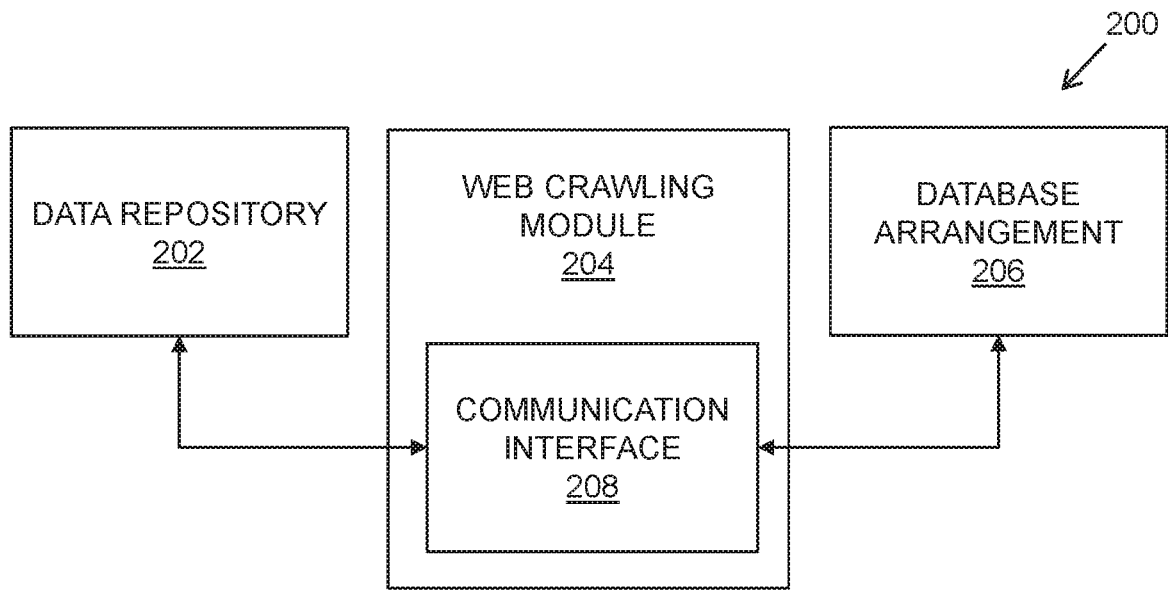
FIG. 2 is a block diagram of a system for performing topic-based aggregation of web content, in accordance with an embodiment of the present disclosure.

Referring to FIG. 2, there is shown a block diagram of a system 200 for performing topic-based aggregation of web content, in accordance with an embodiment of the present disclosure. The system 200 comprises a data repository 202, a web crawling module 204 and a database arrangement 206. The web crawling module 204 includes a communication interface 208 for establishing a data connection with the data repository 202. Additionally, the web crawling module 204 is communicably coupled to the database arrangement 206, such as, via the communication interface 208. Furthermore, the web crawling module 204 is operable to acquire the Uniform Resource Identifiers (URIs) from the data repository 202 to access web locations associated to the Uniform Resource Identifiers (URIs) and subsequently extract the web content form such web locations. The web crawling module 204 is operable to process the extracted web content and generate topic-based web content. Subsequently, the database arrangement 206 is operable to store the generated topic-based web content therein. Optionally, the database arrangement 206 is configured to store the generated topic-based web content by classifying the topic-based web content into categories and subcategories.

Figure 3:
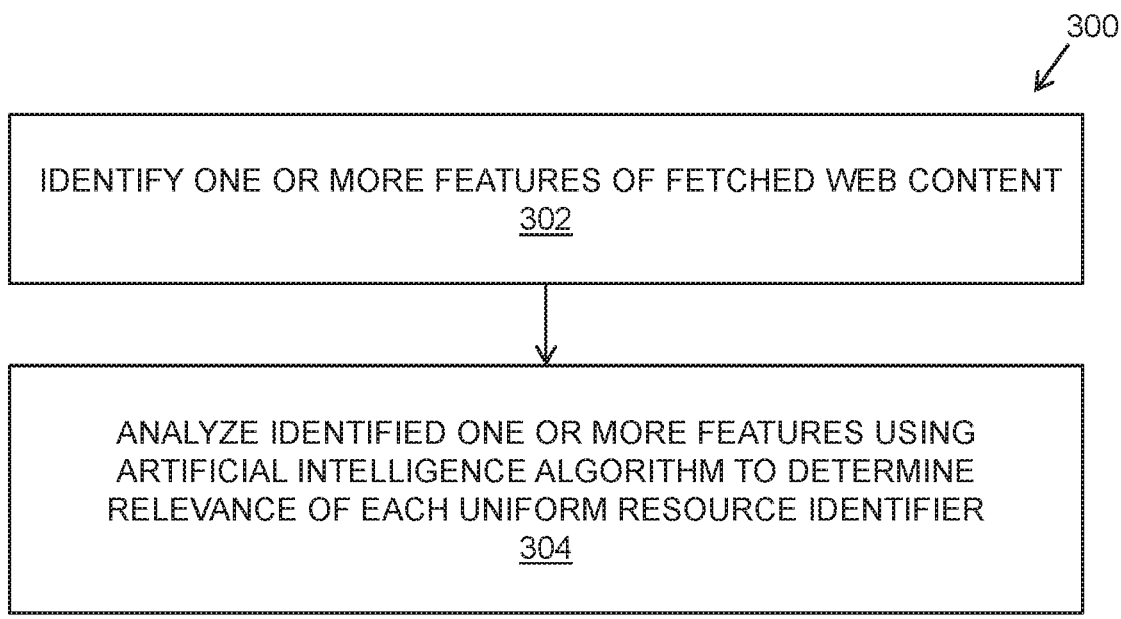
FIG. 3 is an illustration of steps of a method of determining a relevance of Uniform Resource Identifiers, in accordance with an exemplary embodiment of the present disclosure.

Referring to FIG. 3, there are shown steps of a method 300 of determining a relevance of Uniform Resource Identifiers, in accordance with an exemplary embodiment of the present disclosure. At a step 302, one or more features of the fetched web content are identified. At a step 304, the identified one or more features are analyzed using an artificial intelligence algorithm to determine the relevance of each of the plurality of Uniform Resource Identifiers.

Figure 4:
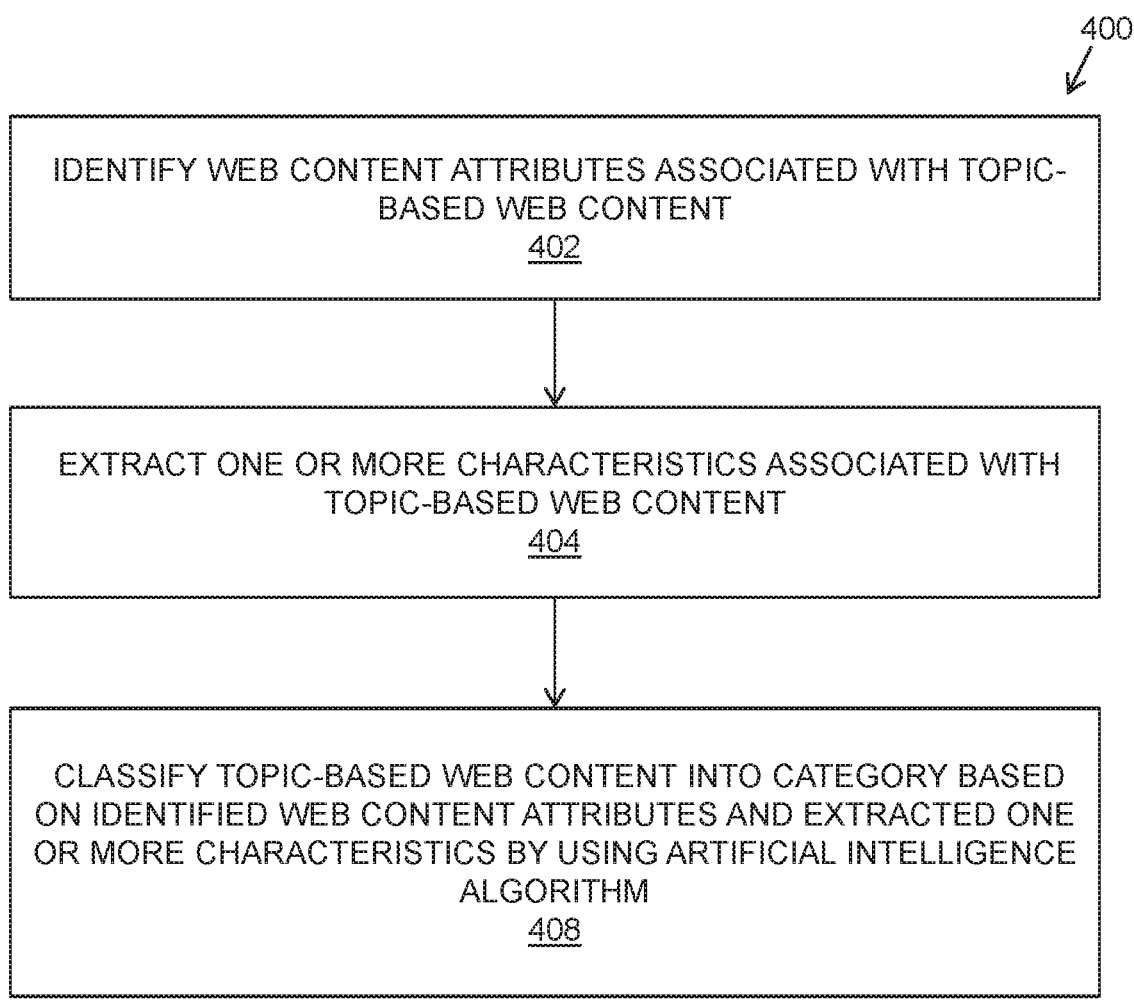
FIG. 4 is an illustration of steps of a method of classifying the topic-based web content into a category, in accordance with an exemplary embodiment of the present disclosure.

Referring to FIG. 4, there are shown steps of a method 400 of classifying the topic-based web content into a category, in accordance with an exemplary embodiment of the present disclosure. At step a 402, web content attributes associated with the topic-based web content are identified. At step a 404, one or more characteristics associated with the topic-based web content are extracted. At a step 406, the topic-based web content is classified into the category based on the identified web content attributes and the extracted one or more characteristics by using an artificial intelligence algorithm.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of crawling webpages and aggregating topic-based web content, wherein the method comprises:
  a) receiving a plurality of Uniform Resource Identifiers, wherein each of the plurality of Uniform Resource Identifiers points to a web location related to a subject-matter;
  b) identifying one or more portions of a webpage located at the web location relevant to the subject matter;
  c) crawling the one or more portions of the webpage to fetch web content, wherein the web content includes one or more elements;
  d) generating an electronic record file for storing:
    the web content including the one or more elements; and
    meta-information associated with the crawling the one or more portions of the web page;
  e) identifying a first type of element and at least a second type of element of the one or more elements associated with the web content stored in the electronic record file;
  f) processing:
    the first type of element to classify a topic-based web content, wherein the topic-based web content corresponds to a category associated with the subject-matter, and wherein the topic-based web content further comprises metadata associated with the topic-based web content, wherein the metadata includes a hash value or digest associated with the topic-based web content; and
    the at least one second type of element to obtain operational data, wherein the operational data comprises one or more hyperlinks retrieved from the web content stored in the electronic record file;
  wherein the processing of the at least one second type of element to obtain the operational data further comprises:
    assigning a score to each of the one or more hyperlinks of the operational data, wherein assigning the score to each of the one or more hyperlinks of the operational data includes calculating a probability of acquiring relevant web content from an associated web location of the one or more hyperlinks; and
    determining a crawling strategy and a hyperlink priority for crawling the one or more portions associated with each of the one or more hyperlinks based on the calculated probability to fetch the web content as per (d) to (f);
  and
  g) aggregating the topic-based web content and the operational data into a database arrangement, wherein the database arrangement stores the topic based web content based on the hash value associated with the topic based web content.

2. The method of claim 1, wherein the crawling of the one or more portions of the webpage further comprises determining a relevance of each of the plurality of Uniform Resource Identifiers, wherein the fetched web content is fetched based on a determined relevance of each of the plurality of Uniform Resource Identifiers.

3. The method of claim 2, wherein determining the relevance of each of the plurality of Uniform Resource Identifiers further comprises:
  identifying one or more features of the fetched web content; and
  analyzing the identified one or more features using an artificial intelligence algorithm to determine the relevance of each of the plurality of Uniform Resource Identifiers.

4. The method of claim 1, wherein the one or more elements comprise any one or more of: web forms, hyperlinks, text, and metadata associated with the one or more elements.

5. The method of claim 4, wherein the method further comprises:
  determining the one or more elements to be a web form;
  extracting one or more web form attributes from the web form;
  identifying one or more input fields in the web form based on the extracted one or more web form attributes; and
  populating the one or more input fields with information fetched from an ontology database.

6. The method of claim 1, wherein the operational data comprises one or more hyperlinks retrieved from the web content stored in the electronic record file.

7. The method of claim 1, wherein the processing the first type of element to classify the topic-based web content further comprises classifying the topic based web content into the category associated with the subject-matter.

8. The method of claim 7, wherein classifying the topic based web content into the category comprises:
  identifying web content attributes associated with the topic-based web content;
  extracting one or more characteristics associated with the topic-based web content; and
  classifying the topic-based web content into the category based on the identified web content attributes and the extracted one or more characteristics by using an artificial intelligence algorithm.

9. A system for crawling webpages and aggregating topic-based web content, wherein the system comprises:
  a data repository configured to store a plurality of Uniform Resource Identifiers;
  a web crawling module including a communication interface for establishing a data connection with the data repository, wherein the web crawling module is configured to:
    receive the plurality of Uniform Resource Identifiers from the data repository, wherein each of the plurality of Uniform Resource Identifiers points to a web location related to a subject-matter;
    identify one or more portions of a webpage located at the web location relevant to the subject matter;
    crawl the one or more portions of the webpage to fetch web content, wherein the web content includes one or more elements;
  generate an electronic record file for storing:
    the web content including the one or more elements; and
    meta-information associated with the crawling of the webpage;
  identify a first type of element and at least a second type of element of the one or more elements associated with the web content stored in the electronic record file;
  process:
    the first type of element to obtain a topic-based web content, wherein the topic-based web content corresponds to a category associated with the subject-matter, and wherein the topic-based web content further comprises metadata associated with the topic-based web content, wherein the metadata includes a hash value or digest associated with the topic-based web content; and the at least one second type of element to obtain operational data, wherein the operational data comprises on or more hyperlinks retrieved from the web content stored in the electronic record file wherein the operational data comprises one or more hyperlinks retrieved from the web content stored in the electronic record file, and wherein the processing of the at least one second type of element by the web crawling module to obtain the operational data further comprises:

assigning a score to each of one or more hyperlinks of the operational data wherein scoring of each of the hyperlinks includes calculating a probability of acquiring relevant web content form associated web location; and determining a crawling strategy and a hyperlink priority for crawling the one or more portions associated with each of the one or more hyperlinks based on the calculated probability to fetch the web content, and a database arrangement communicably coupled to the web crawling module, wherein the database arrangement is configured to aggregate the topic-based web content and the operational data, wherein the database arrangement stores the topic based web content based on the hash value associated with the topic based web content.

10. The system of claim 9, wherein the crawling of the one or more portions of the webpage by the web crawling module further comprises the web crawling module determining a relevance of each of the plurality of Uniform Resource Identifiers, wherein the web content is fetched based on the determined relevance of each of the plurality of Uniform Resource Identifiers.

11. The system of claim 10, wherein determining the relevance by the web crawling module further comprises:
identifying one or more features of the fetched web content; and
analyzing the identified one or more features using an artificial intelligence algorithm to determine the relevance of each of the plurality of Uniform Resource Identifiers.

12. The system of claim 9, wherein the one or more elements comprise any one of: web forms, hyperlinks, text, metadata associated with the one or more elements.

13. The system of claim 12, wherein the web crawling module is further configured to:
determine the one or more elements to be a web form;
extract one or more web form attributes from the web form;
identify one or more input fields in the web form based on the extracted one or more web form attributes; and
populate the one or more input fields with information fetched from an ontology database.

14. The system of claim 9, wherein the operational data comprises one or more hyperlinks retrieved from the web content stored in the electronic record file.

15. The system of claim 9, wherein the processing the first type of element by the web crawling module to obtain the topic-based web content further comprises classifying the topic-based web content into the category associated with the subject-matter.

16. The system of claim 15, wherein classifying the topic-based web content into the category comprises:
identifying web content attributes associated with the topic-based web content;
extracting one or more characteristics associated with the topic-based web content; and
classifying the topic-based web content into the category based on the identified web content attributes and the extracted one or more characteristics by using an artificial intelligence algorithm.

17. A non-transitory computer readable medium containing, program instructions for execution on a computer system, which when executed by a computer, cause the computer to perform method steps for method of crawling webpages and aggregating topic-based web content, the method comprising:

a) receiving a plurality of Uniform Resource Identifiers, wherein each of the plurality of Uniform Resource Identifiers points to a web location related to a subject-matter;

b) identifying one or more portions of a webpage located at the web location relevant to the subject matter;

c) crawling the one or more portions of the webpage to fetch web content, wherein the web content includes one or more elements;

d) generating an electronic record file for storing: the web content including the one or more elements; and meta-information associated with the crawling of the one or more portions of the webpage;

e) identifying a first type of element and at least a second type of element of the one or more dements associated with the web content stored in the electronic record file;

f) processing:
the first type of dement to obtain a topic-based web content, wherein the topic-based web content corresponds to a category associated with the subject-matter, and wherein the topic-based web content further comprises metadata associated with the topic-based web content, wherein the metadata include a hash value or digest associated with the topic-based web content; and
the at least one second type of element to obtain operational data wherein the operational data comprises one or more hyperlinks retrieved from the web content stored in the electronic record file;

and wherein the processing of the at least one second type of dement to obtain the operational data further comprises:
assigning a score to each of one or more hyperlinks of the operational data, wherein scoring of each of the hyperlinks includes calculating a probability of acquiring relevant web content form associated web location; and
determining a crawling strategy and a hyperlink priority for crawling the one or more portions associated with each of the one or more hyperlinks based on the calculated probability to fetch the web content as per (d) to (f);

g) aggregating the topic-based web content and the operational data into a database arrangement, wherein the database arrangement stores the topic based web content based on the hash value associated with the topic based web content.

* * * * *